(12) United States Patent
Perez

(10) Patent No.: US 9,049,905 B2
(45) Date of Patent: Jun. 9, 2015

(54) CLIP AND COUPLING ASSEMBLY

(71) Applicant: GM GLOBAL TECHNOLOGY OPERATIONS LLC, Detroit, MI (US)

(72) Inventor: Tito G. Perez, Toluca (MX)

(73) Assignee: GM Global Technology Operations LLC, Detroit, MI (US)

( * ) Notice: Subject to any disclaimer, the term of this patent is extended or adjusted under 35 U.S.C. 154(b) by 52 days.

(21) Appl. No.: 14/061,094

(22) Filed: Oct. 23, 2013

(65) Prior Publication Data

US 2015/0107064 A1  Apr. 23, 2015

(51) Int. Cl.
F16B 2/20 (2006.01)
A44B 17/00 (2006.01)
F16B 2/24 (2006.01)

(52) U.S. Cl.
CPC ............. *A44B 17/0047* (2013.01); *F16B 2/243* (2013.01); *F16B 2/20* (2013.01)

(58) Field of Classification Search
CPC ...... F16B 2/20; F16B 2/2423; A44B 17/0047
See application file for complete search history.

(56) References Cited

U.S. PATENT DOCUMENTS

| | | | | |
|---|---|---|---|---|
| 2,109,213 A * | 2/1938 | Fearing | ......................... | 403/283 |
| 2,496,866 A * | 2/1950 | Flora | ............................. | 439/857 |
| 3,216,685 A * | 11/1965 | Raymond | .................... | 248/74.2 |
| 3,525,129 A * | 8/1970 | Holton | ............................. | 24/295 |
| 3,630,554 A * | 12/1971 | Cherniak | ......................... | 52/713 |
| 3,673,643 A * | 7/1972 | Kindell | ............................. | 24/458 |
| 5,127,577 A * | 7/1992 | Lynch et al. | .................... | 238/378 |
| 6,044,612 A * | 4/2000 | Shipman et al. | .................. | 52/714 |
| 6,302,884 B1 * | 10/2001 | Wellisz et al. | ............... | 606/86 B |
| 6,375,141 B1 * | 4/2002 | Kettlestrings | .................. | 248/303 |
| 6,652,531 B2 * | 11/2003 | Wellisz et al. | ................. | 606/916 |
| 6,679,885 B2 * | 1/2004 | Wellisz | ............................. | 606/75 |
| 6,709,437 B2 * | 3/2004 | Wellisz | ............................. | 606/71 |
| 8,899,463 B2 * | 12/2014 | Schall et al. | ................ | 227/176.1 |
| 2002/0108219 A1 * | 8/2002 | McAllister | ....................... | 24/536 |
| 2003/0079319 A1 * | 5/2003 | McAllister | ....................... | 24/536 |
| 2004/0170942 A1 * | 9/2004 | Heiser | ............................. | 433/11 |
| 2011/0180676 A1 * | 7/2011 | Yasunaga | ................. | 248/231.81 |
| 2011/0209276 A1 * | 9/2011 | Lu et al. | ............................. | 4/223 |
| 2011/0260025 A1 * | 10/2011 | Aoshima et al. | .......... | 248/231.81 |
| 2011/0266862 A1 * | 11/2011 | Halle et al. | ...................... | 301/5.21 |
| 2012/0174350 A1 * | 7/2012 | Delle Donne | .................... | 24/457 |
| 2012/0298813 A1 * | 11/2012 | Gibbons et al. | ............... | 248/201 |
| 2013/0015288 A1 * | 1/2013 | Hernandez et al. | ............ | 244/3.1 |
| 2013/0327799 A1 * | 12/2013 | Sitz | ................................ | 224/243 |

* cited by examiner

Primary Examiner — Lori L Lyjak
(74) Attorney, Agent, or Firm — Quinn Law Group, PLLC

(57) ABSTRACT

A clip can couple components together and includes a substantially u-shaped clip portion. The substantially u-shaped clip portion includes a first lateral portion, a second lateral portion, and a curved clip portion interconnecting the first and second lateral portions. The clip further includes a retention clip portion extending from the first lateral portion. Additionally, the clip includes an insertion clip portion extending from the retention clip portion. The insertion clip portion is obliquely angled relative to the retention clip portion.

19 Claims, 6 Drawing Sheets

CLIP AND COUPLING ASSEMBLY

TECHNICAL FIELD

The present disclosure relates to a clip and a coupling assembly.

BACKGROUND

Many assemblies use fasteners, such as clips and snap fit fasteners, to couple parts together. It is useful to develop a clip that can engage a snap fit fastener in order to couple parts together. It is also useful to minimize the force necessary to couple the snap fit fastener to the clip and to maximize the force necessary to decouple the snap fit fastener from the clip.

SUMMARY

The present disclosure relates to a clip capable of being coupled to a snap fit fastener in order to couple two parts together. By using the presently disclosed clip, the force necessary to couple the snap fit fastener to the clip is minimized and the force necessary to decouple the snap fit fastener from the clip is maximized. Consequently, the clip can be couple and decouple from the snap fit fastener multiple times.

In an embodiment, the clip includes a substantially u-shaped clip portion. The substantially u-shaped clip portion includes a first lateral portion, a second lateral portion, and a curved clip portion interconnecting the first and second lateral portions. The clip further includes a retention clip portion extending from the first lateral portion. Additionally, the clip includes an insertion clip portion extending from the retention clip portion. The insertion clip portion is obliquely angled relative to the retention clip portion.

The present disclosure also relates to a coupling assembly. In an embodiment, the coupling assembly includes a first component and a second component. The second component includes a component body. The second component defines first and second cavities spaced apart from each other. Further, the second component includes a dividing wall extending from the component body. The dividing wall separates the first and second cavities. The coupling assembly further includes a snap fit fastener extending from the first component. The snap fit fastener includes an elongated support extending from the first component. Further, the snap fit fastener includes a snap fit overhang extending from the elongated support. The snap fit overhang defines a retention surface and is at least partly disposed in the first cavity. The coupling assembly further includes a clip as described above. The substantially u-shaped clip portion of the clip is at least partially disposed in the second cavity of the second component. The retention clip portion of the clip is in contact with the retention surface in order to couple the first component to the second component. The present disclosure also relates to a vehicle body including the coupling assembly described above.

The above features and advantages and other features and advantages of the present invention are readily apparent from the following detailed description of the best modes for carrying out the invention when taken in connection with the accompanying drawings.

DETAILED DESCRIPTION

Figure 1:
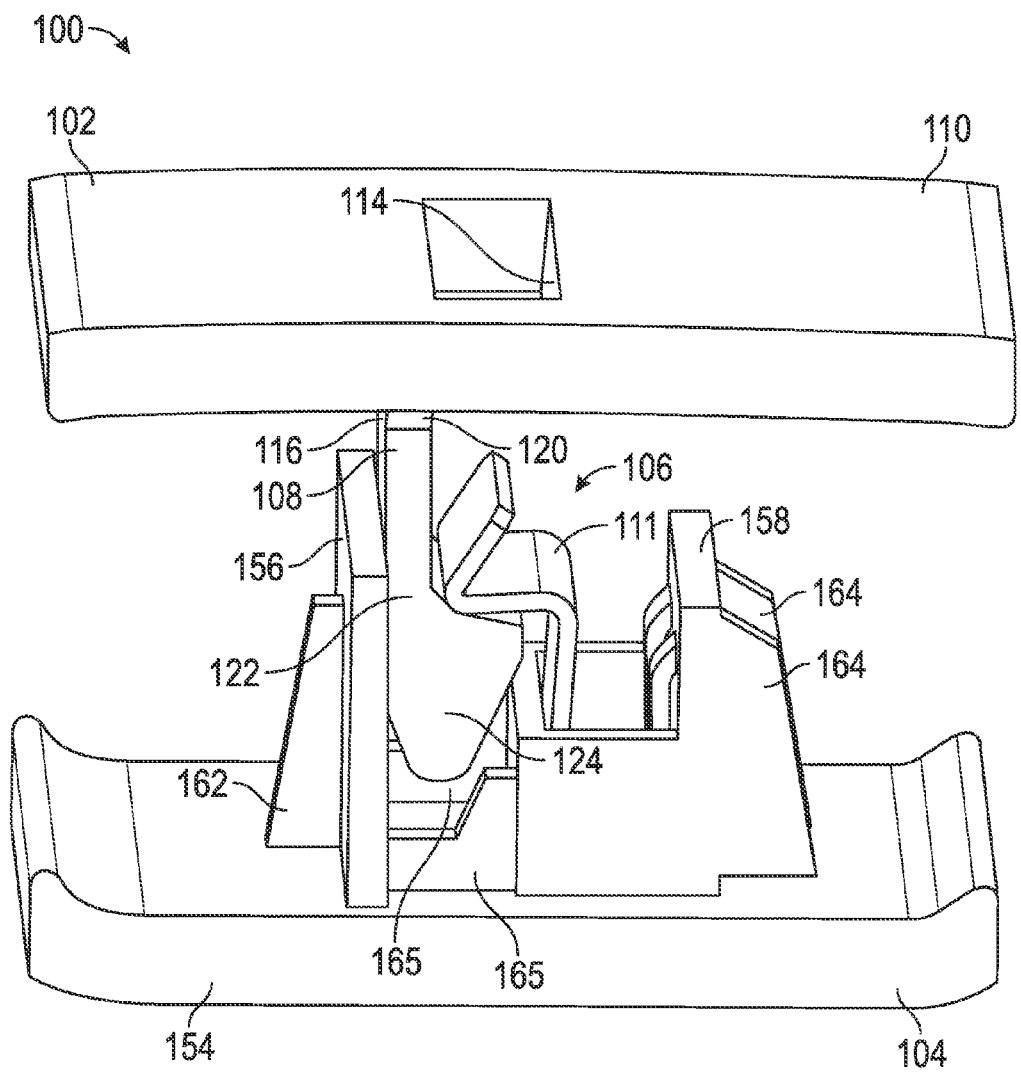
FIG. 1 is a schematic, perspective view of a coupling assembly including a first component, a snap fit fastener extending from the first component, a second component, and a clip partially disposed within the second component.

Referring to the drawings, wherein like reference numerals are used to identify like or identical components in the various views, FIG. 1 schematically illustrates a portion of a vehicle body 100, such as a car body, including a first component 102 and a second component 104. The first and second components 102, 104 may be panels and, as such, may be referred to as first and second panels. The vehicle body 100 further includes a coupling assembly 106 for coupling the first component 102 to the second component 104. The coupling assembly 106 includes a snap fit fastener 108 extending from the first component 102, and a clip 111 fixed relative to the second component 104. The first and second components 102, 104 may be part of the coupling assembly 106. As described in detail below, the clip 111 can contact the snap fit fastener 108 in order to couple the first component 102 to the second component 104.

Figure 2:
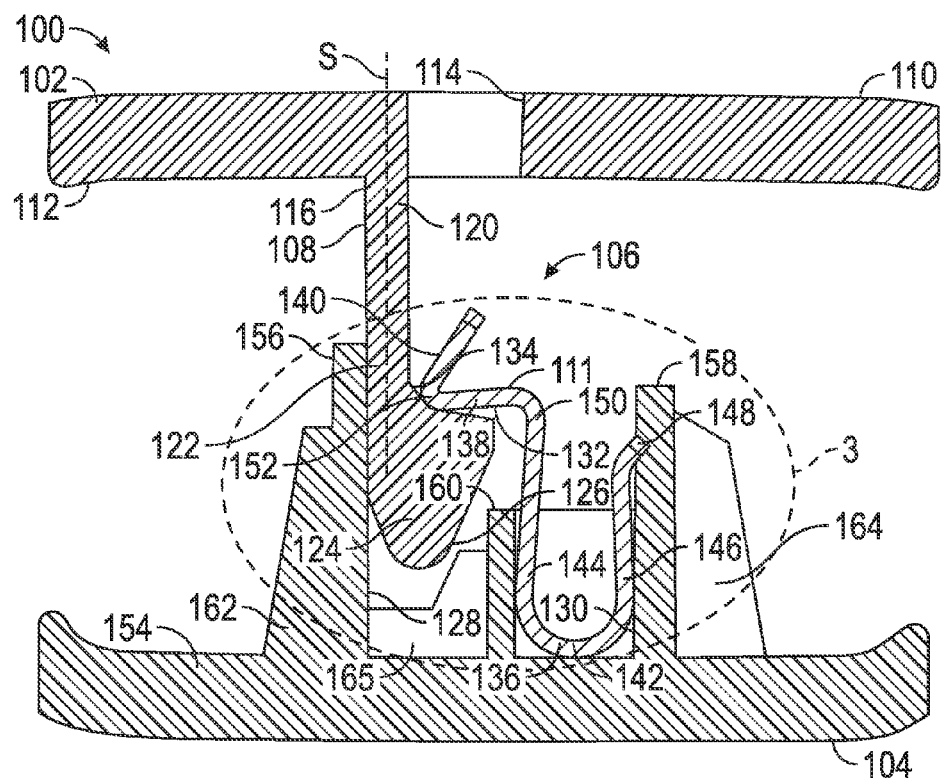
FIG. 2 is a schematic, cross-sectional side view of the coupling assembly shown in FIG. 1.

With reference to FIGS. 1 and 2, the first component 102 defines a first component surface 110 and a second component surface 112 (FIG. 2) opposite the first component surface 110. The first component 102 may be made using an injection molding process and, as a consequence, may define a component hole 114 extending from the first component surface 110 to the second component surface 112. However, it is envisioned that the first component 102 may not have the component hole 114.

The snap fit fastener 108 may extend from the second component surface 112 of the first component 102 in a direction away from the first component surface 110. The first component 102 may be integrally formed with the snap fit fastener 108. As such, the snap fit fastener 108 and first component 102 may collectively form a monolithic or unitary structure (i.e., a one-piece structure). The snap fit fastener 108 includes an elongated support 116, such as a beam, arm, column or plate, coupled to the first component 102. The elongated support 116 may be cantilevered from the first component 102. Accordingly, the elongated support 116 may also be referred to as a cantilevered support, a cantilevered beam, a cantilevered arm, a cantilevered column, or a cantilevered plate. In the depicted embodiment, the elongated support 116 extends along a longitudinal axis S (FIG. 2) and includes a first end portion 120 directly secured to the first component 102 and a second end portion 122 opposite the first end portion 120.

The snap fit fastener 108 additionally includes a snap fit overhang 124 (or any other suitable retaining feature) extending from the elongated support 114. Specifically, the snap fit overhang 124 extends from the second end portion 122 of the elongated support 116.

Figure 3:
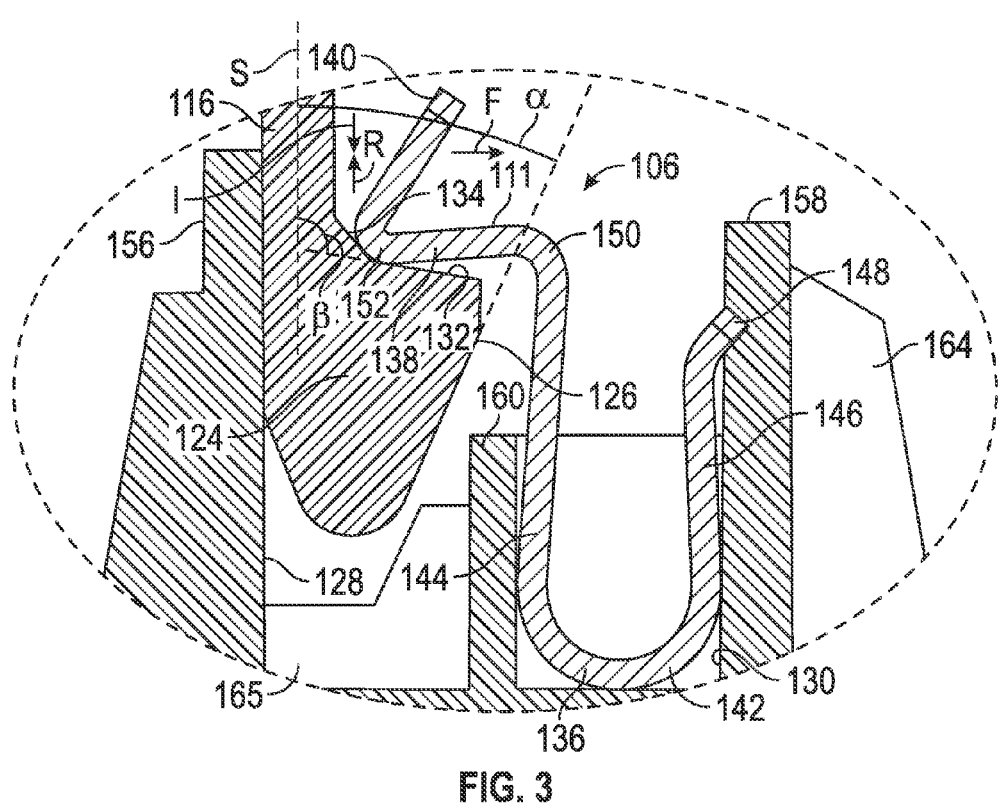
FIG. 3 is a schematic, enlarged, cross-sectional side view of the coupling assembly shown in FIG. 1, taken around section 3 of FIG. 2.

With reference to FIG. 3, the snap fit overhang 124 defines an insertion surface 126 obliquely angled relative to the longitudinal axis S. In particular, the insertion surface 126 is angled relative to the longitudinal axis S at an insertion angle α. The insertion angle α is an oblique angle. As a non-limiting example, the insertion angle α may range between 15 and 30 degrees. For example, the insertion angle α may be about 25 degrees. The aforementioned examples of the insertion angle α are useful to minimize the force necessary to couple the snap fit fastener 108 to the clip 111. The insertion angle α is directly proportional to the insertion force I required to insert the snap fit overhang 124 into a first cavity 128 defined by the second component 104 and the clip 111 when the clip 111 is partially disposed in a second cavity 130 of the second component 104. In other words, if the insertion angle α is increased, the insertion force I increases. Conversely, if the insertion angle α is decreased, the insertion force I is decreased. While assembling the coupling assembly 106, the snap fit fastener 108 can be moved toward the first cavity 128 partially defined by the second component 104 when the clip 111 is partially disposed in the second cavity 130. Continued movement of the snap fit fastener 108 toward the first cavity 128 eventually causes the insertion surface 126 to contact the clip 111. Specifically, continued movement of the snap fit fastener 108 toward the first cavity 128 causes the insertion surface 126 to slide along the clip 111. While the insertion surface 126 slides relative to the clip 111, the clip 111 may elastically deform but, eventually, the clip 111 returns to its original shape, thereby coupling the first and second components 102, 104 together.

With continued reference to FIG. 3, the snap fit overhang 124 further defines a first retention surface 132 and a second retention surface 134 directly intersecting the first retention surface 132. The second retention surface 134 may be obliquely angled relative to the first retention surface 132 and the longitudinal axis S. The first and second retention surfaces 132, 134 are configured to contact the clip 111 when the snap fit overhang 124 is at least partially disposed in the first cavity 128 in order to couple the snap fit fastener 108 to the clip 111. The first retention surface 132 is angled relative to the longitudinal axis S. In particular, the first retention surface 132 is angled relative to the longitudinal axis S at a retention angle β. The retention angle β may be an oblique angle. As non-limiting examples, the retention angle β may range between 110 and 80 degrees. For example, the retention angle β may be about 100 degrees. The aforementioned examples of the retention angle β are useful to facilitate retention of the snap fit overhang 124 within the first cavity 128. The retention angle β is indirectly proportional to the extraction force R necessary to remove the snap fit overhang 124 from the first cavity 128 while the clip 111 is at least partially disposed in the second cavity 130. In other words, if the retention angle β is increased, the extraction force R is decreased. Conversely, if the retention angle β is decreased, the extraction force R is increased. While decoupling the first and second components 102, 104, the extraction force R is applied to the snap fit fastener 108 (or the second component 104). At this point, the first retention surface 132 contacts the clip 111, thereby inhibiting the snap fit overhang 124 from being removed from the first cavity 128. However, sufficient extraction force R can be applied to the snap fit fastener 108 (or the second component 104) to remove the snap fit overhang 124 from the first cavity 128, thereby decoupling the first component 102 from the second component 104. The snap fit overhang 124 may only include the first retention surface 132 and, thus, the first retention surface 132 may be referred to as the retention surface.

Figure 4:
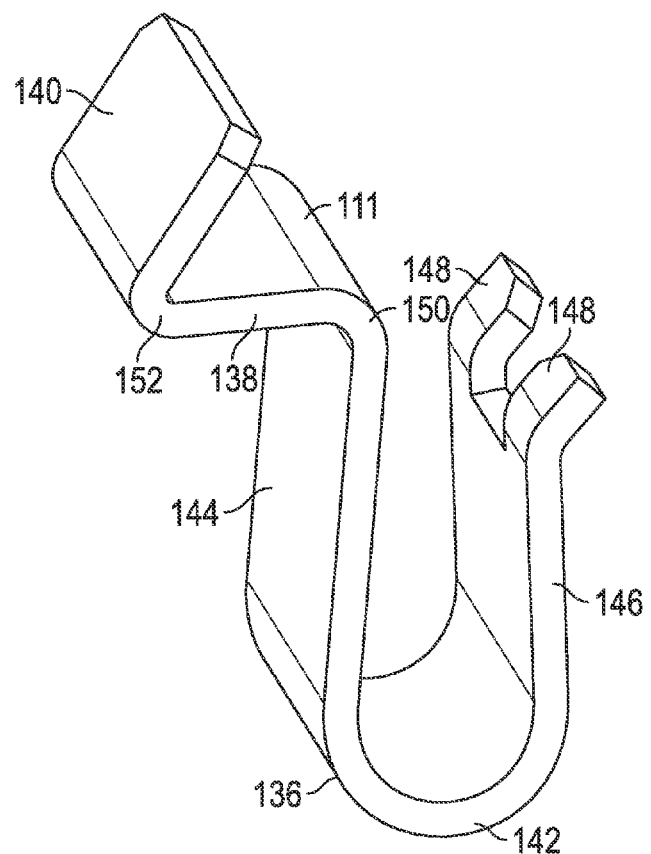
FIG. 4 is a schematic, perspective view of the clip shown in FIG. 1.

With reference to FIG. 4, the clip 111 includes a substantially u-shaped clip portion 136, a retention clip portion 138 extending from the substantially u-shaped clip portion 136, and an insertion clip portion 140 extending from the retention clip portion 138. As used herein, the term "substantially u-shaped clip portion" means a portion of the clip 111 which shape approximates the shape of the letter "U." The substantially U-shaped clip portion 136 is configured, sized, and shaped to be at least partially received in the second cavity 130 (FIG. 2) and includes a first lateral portion 144, a second lateral portion 146, and a curved clip portion 142 interconnecting the first and second lateral portions 144, 146. The curved clip portion 142 may have a concave shape and, as such, may be referred to as the concave clip portion 142. In the depicted embodiment, the curved clip portion 142 directly couples the first lateral portion 144 to the second lateral portion 146. The first and second lateral portions 144, 146 are not necessarily parallel to each other and may have a substantially straight or planar shape. It is contemplated, however, that the first and second lateral portions 144, 146 may be curved.

The clip 111 may further include at least one protrusion 148 extending from the second lateral portion 146. In the depicted embodiment, the clip 111 includes two spaced apart protrusions 148 extending from the second lateral portion 146. The protrusions 148 may be obliquely angled relative to the second lateral portion 146. Moreover, the protrusions 148 are configured to be inserted in the second component 104 to secure the clip 111 to the second component 104. Although the depicted embodiment shows two protrusions 148, it is envisioned that the clip 111 may include more or fewer protrusions 148.

With continued reference to FIG. 4, the retention clip portion 138 extends from the first lateral portion 144 and may be obliquely angled relative to the first lateral portion 144. It is contemplated, however, that the retention clip portion 138 may be perpendicular to the first lateral portion 144. A first elbow 150 may interconnect the first lateral portion 144 and the retention clip portion 138. When the substantially u-shaped clip portion 136 is at least partially disposed in the second cavity 130 (FIG. 2) and the snap fit overhang 124 is at least partially disposed in the first cavity 128, the retention clip portion 138 contacts (or otherwise engages) the first retention surface 132, thereby inhibiting the snap fit fastener 108 from decoupling from the clip 111 and the second component 104. Alternatively or additionally, a second elbow 152, which interconnects the retention clip portion 138 and the insertion clip portion 140 contacts (or otherwise engages) the first retention surface 132, thereby inhibiting the snap fit fastener 108 from decoupling from the clip 111 and the second component 104.

With continued reference to FIG. 4, the insertion clip portion 140 extends from the retention clip portion 138 and may be obliquely angled relative to the retention clip portion 138. The second elbow 152 may interconnect the retention clip portion 138 and insertion clip portion 140. It is contemplated that the second elbow 152 may contact at least a portion of the second retention surface 134 to help retain the snap fit overhang 124 in the first cavity 128 partially defined by the second component 104. When the snap fit overhang 124 is being inserted in the first cavity 128, the insertion clip portion 140 contacts the insertion surface 126 as the snap fit overhang 124 slides along the clip 111 and elastically deforms the clip 111. As discussed above, the clip 111 returns to its original shape (after the elastic deformation) once the snap fit overhang 124 is at least partially disposed in the first cavity 128 of the second component 104 as shown in FIG. 3.

With reference again to FIGS. 1-3, the second component 104 includes a component body 154, a first abutment wall 156, a second abutment wall 158 spaced apart from the first abutment wall 158, and a dividing wall 160 separating the first cavity 128 from the second cavity 130. The first abutment wall 156 is configured to contact at least a portion of the snap fit fastener 108. For example, the first abutment wall 156 may be in contact with the elongated support 116. Consequently, the first abutment wall 156 supports at least a portion of the snap fit fastener 108. In particular, the first abutment wall 156 may be in contact with at least a portion of the snap fit overhang 124 and the elongated support 116. Moreover, the first abutment wall 156 partially defines the first cavity 128. The second component 104 may further include a first rib 162 for supporting the first abutment wall 156. The first rib 162 may extend from the component body 154.

The second component 104 may further include a second rib 164 for supporting the second abutment wall 158. The second rib 164 extends from the component body 154. In the depicted embodiment, two ribs (i.e., second ribs 164) support the second abutment wall 158. The second abutment wall 158 partially defines the second cavity 130 and may be in contact with the second lateral portion 146.

The dividing wall 160 extends from the component body 154 and is disposed between the first and second abutment walls 156, 158. Accordingly, the dividing wall 160 partially defines the first and second cavities 128, 130 of the second component 104. When the clip 111 is partially disposed in the second cavity 130, the substantially u-shaped portion 136 may contact the dividing wall 160, second abutment wall 158, and component body 154. For example, the first lateral portion 144 contacts the dividing wall 160, the curved clip portion 142 contacts the component body 154, and the second lateral portion 146 contacts the second abutment wall 158 when the clip 111 is partially inserted in the second cavity 130. The protrusions 148 penetrate the second abutment wall 158 when the clip 111 is partially disposed in the second cavity 130, thereby securing the clip 111 to the second component 104. A third rib 165 may extend from the component body 154 and support the dividing wall 160. In the depicted embodiment, two ribs (i.e., third ribs 165) support the dividing wall 160.

The present disclosure also relates to a method of coupling the first component 102 to the second component 104. The method may include the following steps. First, the clip 111 is partially disposed in the second cavity 130 of the second component 104 such that the substantially u-shaped clip portion 136 is at least partly disposed in the second cavity 130. At this point, the protrusions 148 penetrate the second abutment wall 158. Then, the snap fit fastener 108 (which extends from the first component 102) is moved toward the first cavity 128 of the second component 104 in order to place the snap fit overhang 124 in the first cavity 128. Alternatively, the second component 104 can be moved toward the snap fit fastener 108 in order to place the snap fit overhang 124 in the first cavity 128. Regardless, when the snap fit fastener 108 is moved toward the first cavity 128 (or vice-versa) the insertion surface 126 of the snap fit overhang 124 slides along the insertion clip portion 140, causing the clip 111 to elastically deform to allow the snap fit overhang 124 to move toward the first cavity 128. The snap fit fastener 108 is further advanced toward the first cavity 128 until at least a portion of the retention clip portion 138 is over the first retention surface 132 of the snap fit overhang 124. Thus, the retention clip portion 138 is disposed over the snap fit overhang 124. At this point, the retention clip portion 138, the second elbow 152, or both may contact the first retention surface 132 of the snap fit overhang 124. The second elbow 152 may also contact the second retention surface 134.

The first component 102 may be decoupled from the second component 104 by applying the extraction force R to the snap fit fastener 108 (or to the second component 104) in order to remove the snap fit overhang 124 from the first cavity 128. To facilitate removal of the snap fit overhang 124 from the first cavity 128, a force may be applied to the clip 111 in the direction indicated by arrow F. For example, the force indicated by the arrow F may be applied to the insertion clip portion 140 to elastically deform the clip 111, thereby facilitating removal of the snap fit overhang 124 from the first cavity 128 at least partially defined by the second component 104.

Figure 5:
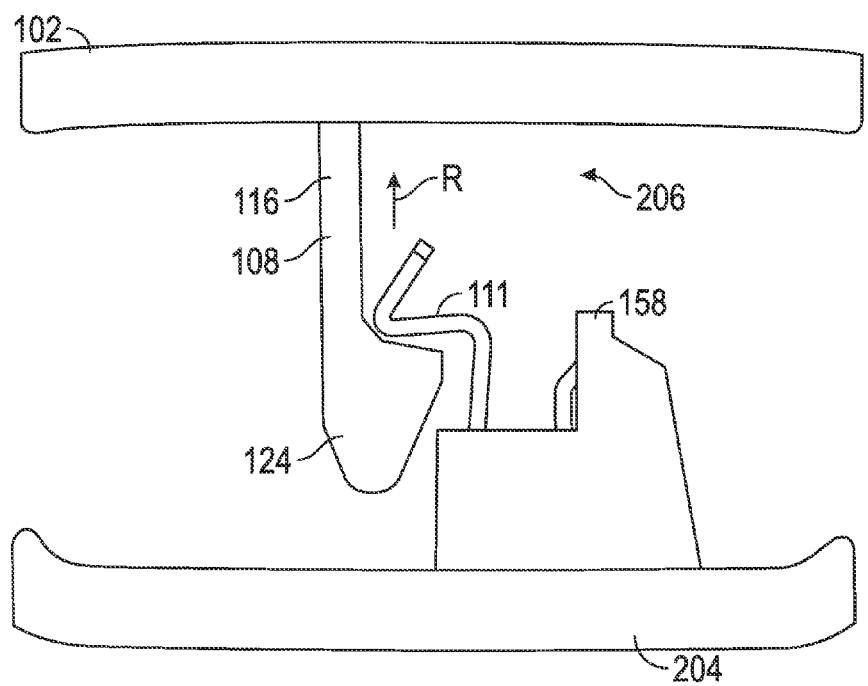
FIG. 5 is a schematic, side view of a coupling assembly in accordance with another embodiment of the present disclosure.

FIG. 5 schematically illustrates a coupling assembly 206 in accordance with another embodiment of the present disclosure. The coupling assembly 206 is substantially similar to the coupling assembly 106 described with respect to FIGS. 1-3, except that the second component 204 does not include the first abutment wall 156 and the snap fit overhang 108 does not contact the clip 111. Rather, another fastener or device (not shown) is used to fix the position of the first component 102 relative to the second component 204. The clip 111 and the snap fit fastener 108 are used to avoid separation of the first component 102 from the second component 204 when an extraction force R is applied to the snap fit fastener 108 (or the second component 204). For this reason, the snap fit overhang 124 does not necessarily contact the clip 111, and an abutment wall is not necessary to support the snap fit fastener 108.

Figure 6:
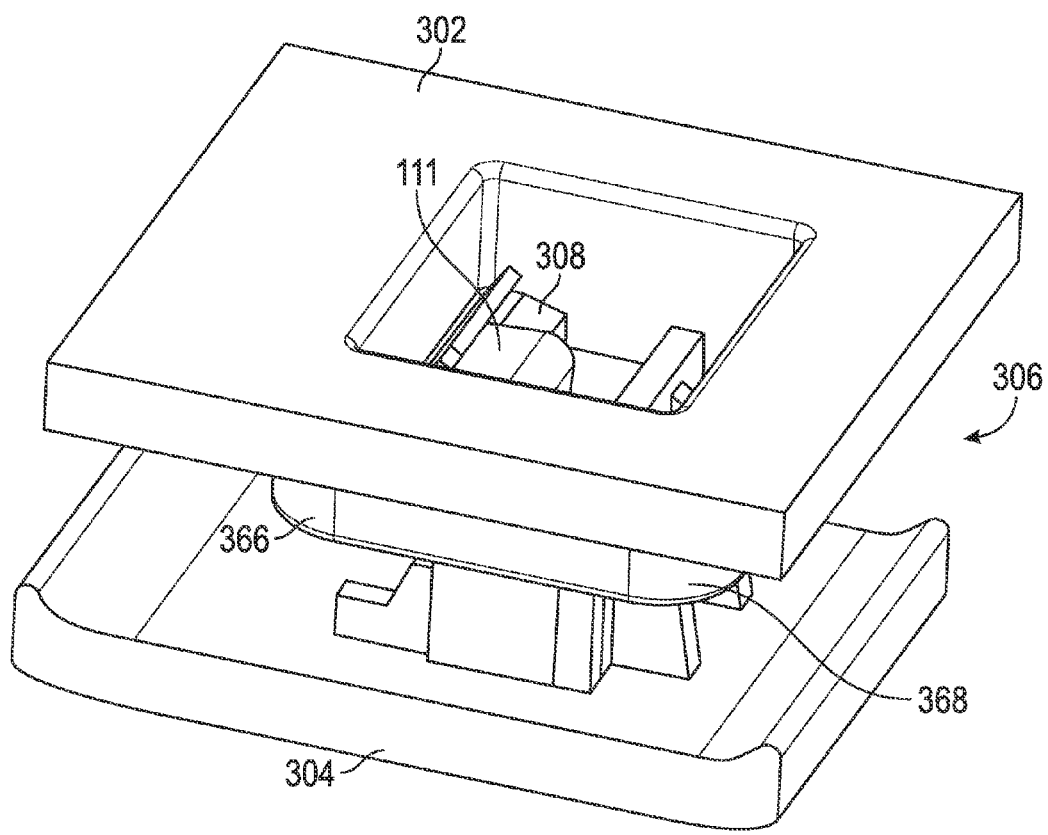
FIG. 6 is a schematic, perspective view of a coupling assembly in accordance with another embodiment of the present disclosure.
Figure 7:
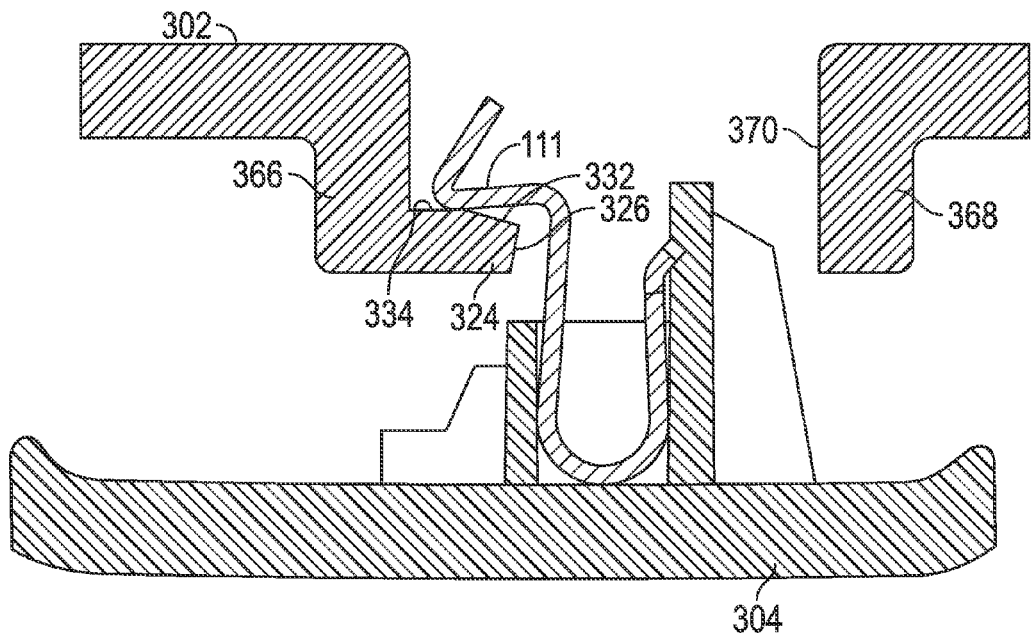
FIG. 7 is a schematic, cross-sectional side view of the coupling assembly shown in FIG. 6.

FIGS. 6 and 7 schematically illustrate a coupling assembly 306 in accordance with another embodiment of the present disclosure. The coupling assembly 306 is substantially similar to the coupling assembly 106 described above with respect to FIGS. 1-3, except that the snap fit fastener 308 is different from the snap fit fastener 108 and the second component 304 does not include an abutment wall supporting the snap fit fastener 308. The snap fit fastener 308 includes a box 366 extending from the first component 302 and a snap fit overhang 324 extending from the box 366. The box 366 includes a box wall 368 defining a box opening 370. The box wall 368 may completely define the box opening 370. As such, the box wall 368 surrounds the box opening 370. The snap fit overhang 324 extends from the box wall 368 toward the box opening 370 and includes an insertion surface 326, a first retention surface 332, and a second retention surface 334. The clip 111 can contact the first and second retention surfaces 332, 334 to maintain the clip 111 coupled to the snap fit fastener 308.

Figure 8:
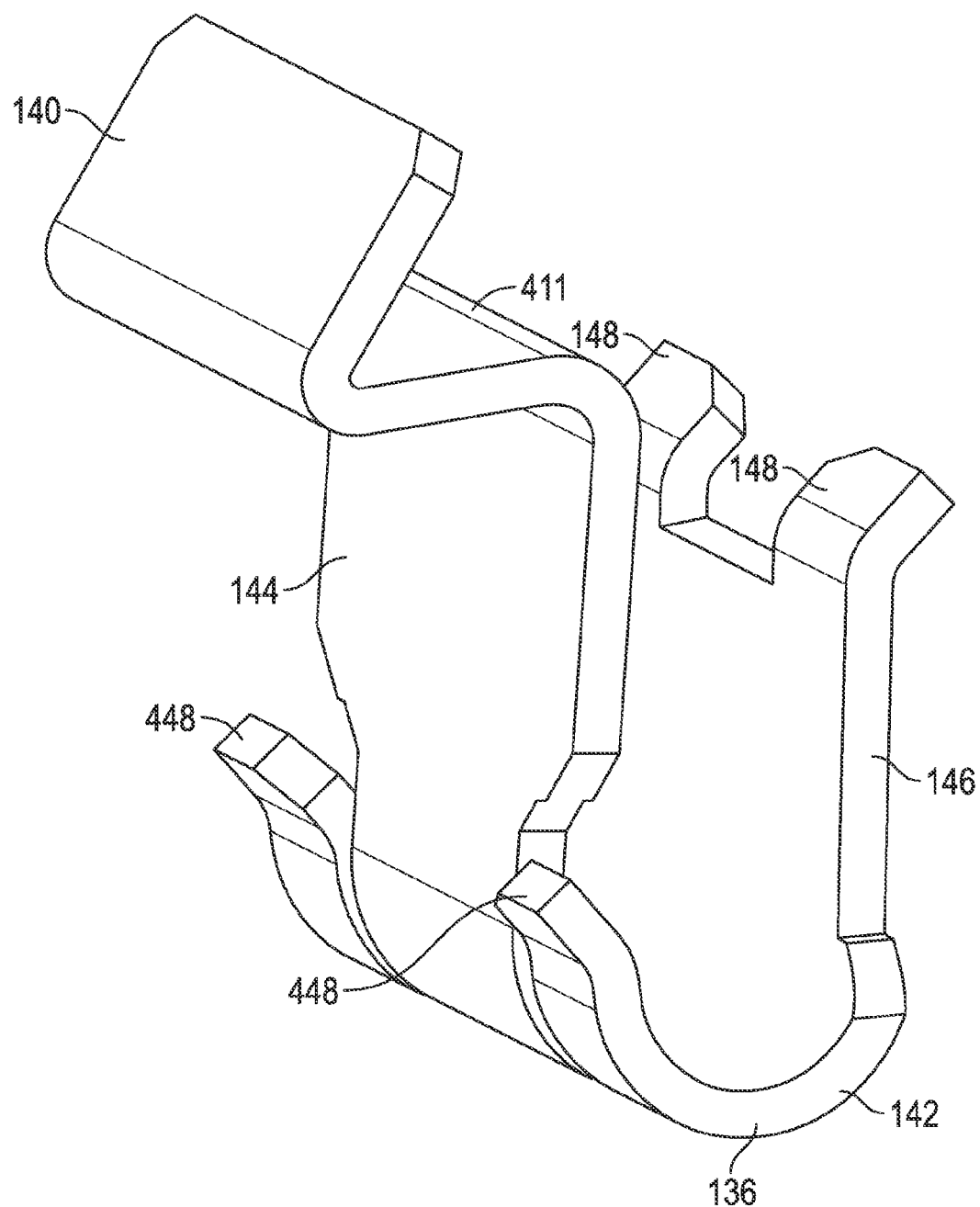
FIG. 8 is a schematic, perspective view of a clip in accordance with another embodiment of the present disclosure.

FIG. 8 schematically illustrates a clip 411 in accordance with another embodiment of the present disclosure. The clip 411 is substantially similar to the clip 111 described above with respect to FIG. 4, except that the clip 411 includes additional protrusions 448 extending from the substantially u-shaped clip portion 136. Specifically, the protrusions 448 extend from the curved clip portion 142 and are configured to penetrate the dividing wall 160 (FIG. 2) to secure the clip 411 to the second component 104 (FIG. 2). Although the depicted embodiment shows two protrusions 448, the clip 411 may include more or fewer protrusions 448.

Figure 9:
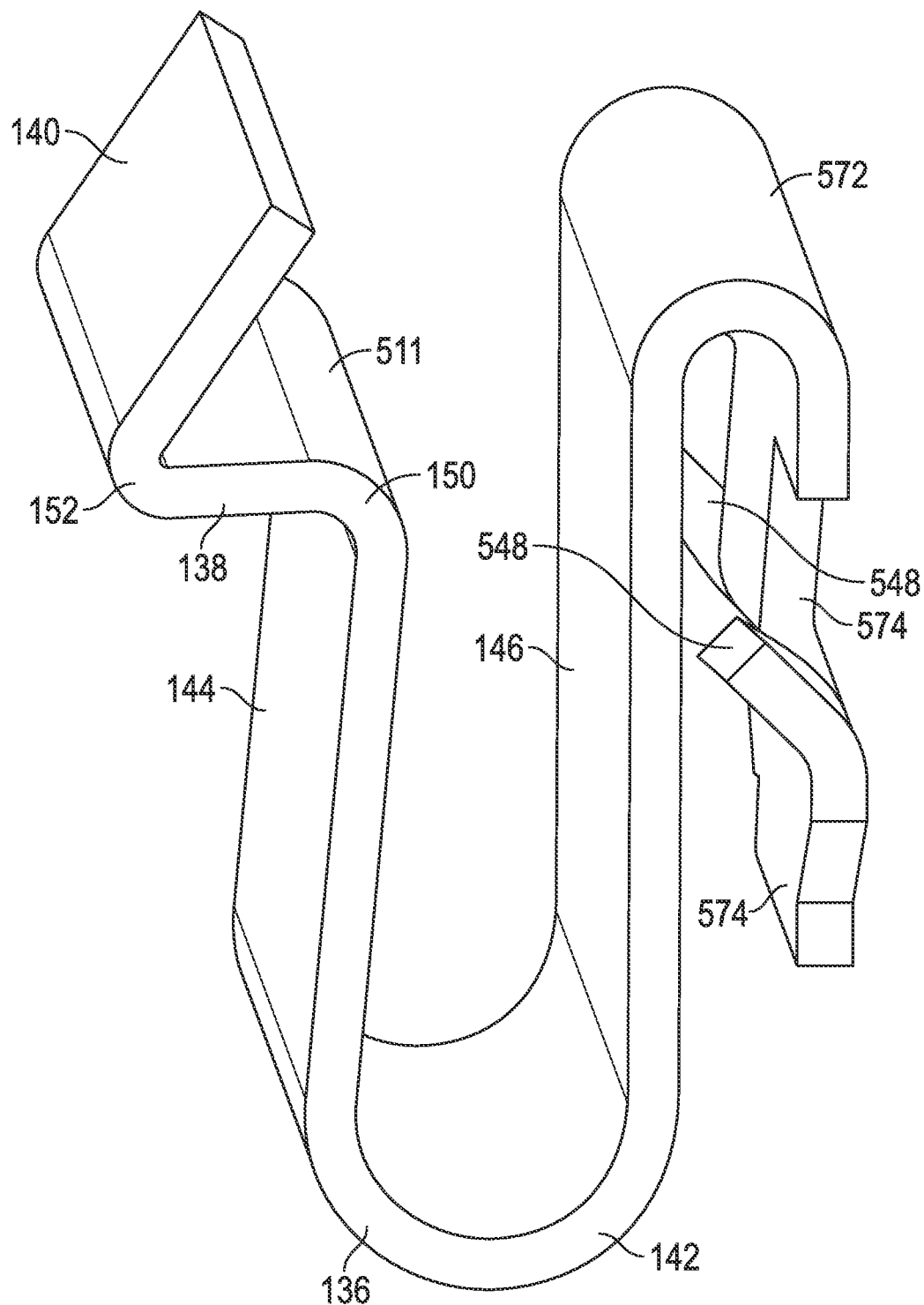
FIG. 9 is a schematic, perspective view of a clip in accordance with another embodiment of the present disclosure.

FIG. 9 schematically illustrates a clip 511 in accordance with another embodiment of the present disclosure. The clip 511 is substantially similar to the clip 111 described above with respect to FIG. 4, except that the clip 511 includes an additional curved clip portion and one additional lateral portion. In particular, the clip 511 includes a first curved clip portion 142 and a second curved clip portion 572 extending from the second lateral portion 146. The second curved clip portion 572 may be concave and, as such, may be referred to as a second concave clip portion. Moreover, the second curved clip portion 572 is configured, shaped, and sized to be disposed over the second abutment wall 158 (FIG. 1) when the first curved clip portion 142 is disposed in the second cavity 130 of the second component 104 (FIG. 2).

The clip 511 further includes a third lateral portion 574 extending from the second curved clip portion 572. The third lateral portion 574 can engage (e.g., contact) the second abutment wall 158 (FIG. 2) when the first curved clip portion 142 is disposed in the second cavity 130 of the second component 104 (FIG. 2). Furthermore, the clip 511 includes protrusions 548 extending from the third lateral portion 574 in a direction toward the second lateral portion 146. The protrusions 548 are obliquely angled relative to the third lateral portion 574 and can penetrate the second abutment wall 158 (FIG. 1) when the first curved clip portion 142 is disposed in the second cavity 130 of the second component 104 (FIG. 2), thereby securing the clip 511 to the second component 104 (FIG. 2). Although the depicted embodiment shows two protrusions 548, it is contemplated that the clip 511 may include more or fewer protrusions 548.

While the best modes for carrying out the invention have been described in detail, those familiar with the art to which this invention relates will recognize various alternative designs and embodiments for practicing the invention within the scope of the appended claims.

The invention claimed is:

1. A clip for coupling components together, the clip comprising:
 a substantially u-shaped clip portion, wherein the substantially u-shaped clip portion includes a first lateral portion, a second lateral portion, and a curved clip portion interconnecting the first and second lateral portions;
 a retention clip portion extending from the first lateral portion; and
 an insertion clip portion extending from the retention clip portion, wherein the insertion clip portion is obliquely angled relative to the retention clip portion.

2. The clip of claim 1, further comprising at least one protrusion extending from the second lateral portion.

3. The clip of claim 2, wherein the at least one protrusion is obliquely angled relative to the second lateral portion.

4. The clip of claim 3, wherein the retention clip portion is obliquely angled relative to the first lateral portion.

5. The clip of claim 1, further comprising at least one protrusion extending from the curved clip portion.

6. The clip of claim 1, wherein the first lateral portion and the second lateral portion are not parallel to each other.

7. The clip of claim 1, wherein the curved clip portion is a first curved clip portion, and the clip further comprises a second curved clip portion coupled to the substantially u-shaped clip portion.

8. The clip of claim 7, wherein the second curved clip portion extends from the second lateral portion.

9. The clip of claim 8, further comprising a third lateral portion extending from the second curved clip portion.

10. The clip of claim 9, further comprising at least one protrusion extending from the third lateral portion.

11. The clip of claim 10, wherein the at least one protrusion is obliquely angled relative to the third lateral portion.

12. A coupling assembly, comprising:
 a first component;
 a second component including a component body, the second component defining first and second cavities spaced apart from each other, wherein the second component includes a dividing wall extending from the component body, the dividing wall separating the first and second cavities;
 a snap fit fastener extending from the first component, the snap fit fastener including an elongated support extending from the first component, the snap fit fastener including a snap fit overhang extending from the elongated support, the snap fit overhang defining a retention surface;
 a clip including a substantially u-shaped clip portion at least partially disposed in the second cavity, the substantially u-shaped clip portion including a first lateral portion, a second lateral portion, and a curved clip portion interconnecting the first and second lateral portions, wherein the clip further includes a retention clip portion extending from the first lateral portion and an insertion clip portion extending from the retention clip portion, the insertion clip portion being obliquely angled relative to the retention clip portion;
 wherein the retention clip portion is disposed over the retention surface.

13. The coupling assembly of claim 12, wherein the elongated support extends along a longitudinal axis, the snap fit overhang defines an insertion surface, and the insertion surface is obliquely angled relative to the longitudinal axis.

14. The coupling assembly of claim 12, wherein the retention surface is obliquely angled relative to the longitudinal axis.

15. The coupling assembly of claim 14, wherein the retention surface is a first retention surface, and the snap fit overhang defines a second retention surface obliquely angled relative to the first retention surface.

16. The coupling assembly of claim 15, wherein the second retention surface is obliquely angled relative to the longitudinal axis.

17. The coupling assembly of claim 12, wherein the second component includes a first abutment wall partially defining the first cavity, and the first abutment wall is in contact with the elongated support.

18. The coupling assembly of claim 17, wherein the second component includes a second abutment wall partially defining the second cavity, and the second lateral portion is in contact with the second abutment wall.

19. A vehicle body, comprising:
 a first component;
 a second component;
 a snap fit fastener extending from the first component, the snap fit fastener including an elongated support extending from the first component, the snap fit fastener including a snap fit overhang extending from the elongated support;
 a clip fixed relative to the second component, the clip including a substantially u-shaped clip portion, the substantially u-shaped clip portion including a first lateral portion, a second lateral portion, and a curved clip portion interconnecting the first and second lateral portions, wherein the clip further includes a retention clip portion extending from the first lateral portion; and
 wherein the retention clip portion is disposed over the snap fit overhang.

* * * * *